United States Patent Office 3,213,088
Patented Oct. 19, 1965

3,213,088
SULFONAMIDES
Kurt Menzl, Linz, Austria, assignor to Osterreichische Stickstoffwerke Aktiengesellschaft, Linz, Austria
No Drawing. Filed June 1, 1964, Ser. No. 371,741
Claims priority, application Austria, June 11, 1963, A 4,681/63
4 Claims. (Cl. 260—239.95)

The present invention relates to new sulfonamide derivatives of 1,2,5-thiadiazole which possess very valuable properties. The sulfonamides of this invention have the following fomula:

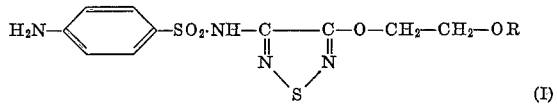

(I)

in which R is an alkyl group containing 1, 2 or 3 carbon atoms.

The compounds of Formula I are long-acting sulfonamides which possess a broad spectrum of effectiveness and by means of which very high and lasting blood-level values can be obtained. For instance, it was revealed by experiments with the compound 4-(4'-aminobenzenesulfonamido)-3-[β-(ethoxy)-ethoxy]-1,2,5 - thiadiazole that after the administration of an oral dose of 1 g. per person a maximum mean blood-level was obtained of 12.5 mg. percent (9.7–15.1 mg. percent) which dropped after 24 hours to approximately half, and after 48 hours to approximately one quarter. It is also noteworthy that when experiments were performed on animals with the sulfonamides according to the invention high rates of survival were achieved even in post-medication experiments, and this indicates a very rapid resorption and therefore a rapid commencement of effect. Similar results were obtained with 4-(4'-aminobenzenesulfonamido)-3-[β-(methoxy)-ethoxy]-1,2,5-thiadiazole and 4-(4'-aminobenzenesulfonamido)-3-[β-(n-propoxy)-ethoxy] - 1,2,5 - thiadiazole. The sulfonamides of Formula I are therefore extremely suitable for combating infectious diseases, more particularly diseases caused by gram-positive germs.

United States Patent No. 2,358,031 discloses in a very general manner sulfonamides of the thiadiazole series and indicates that these sulfonamides are derived from six different aminothiadiazoles, including 3 - amino - 1,2,5-thiadiazole, and may be substituted in the thiadiazole ring by a number of substituents, including alkyl, alkoxy and hydroxy groups. It is stated that many of these compounds display an anti-bacterial activity. However, the patent describes in detail only the 2-sulfanilamido-1,3,4-thiadiazoles which can be substituted, if desired, by a methyl or phenyl radical in the 5-position. The specification of the patent does not disclose thiadiazole-sulfonamides which are substituted in the thiadiazole ring by alkoxyalkyl-, aryl-oxyalkyl, or alkoxy-alkoxylalkyl groups and gives no indication that the sulfonamides of Formula I can be prepared with a 1,2,5-thiadiazole ring and are excellent long-acting sulfonamides.

The new sulfonamides of Formula I can be prepared by reacting a halogen-containing sulfonamide derivative having the formula:

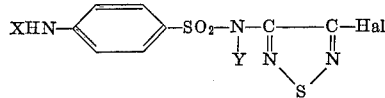

(II)

in which X is an acyl radical, more particularly an acetyl or carboethoxy radical, Y is a hydrogen atom or a group having the fomula:

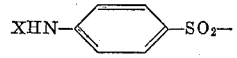

and Hal is a halogen atom, preferably chlorine or bromine, or a mixture of mono and bis sulfonyl derivatives having the Formula II with an alcoholate having the formula:

$$MeO-CH_2-CH_2-O-R \quad (III)$$

in which R is as defined above and Me is an alkali metal ion.

In the reaction product the acyl group in the 4-position of the benzene ring must then be split off and this is most advantageously performed by alkaline saponification. If the starting material for the reaction according to the invention is a halogen-containing sulfonamide derivative of Formula II in which Y is an acyl aminobenzenesulfonyl radical, this radical is mainly split off during the alkoxylation. Any bis-sulfonyl compound which is still present is then converted into the mono-sulfonamide compound during the splitting off of the acyl radical.

The reaction is conveniently performed at an elevated temperature, preferably within the range of 50° to 70° C. It is advisable to use the alcoholate of Formula III in excess, more particularly when the starting material is a bis-sulfonamide compound, since in that case some of the alcoholate is used up by the splitting of the compound. Advantageously, the solvent used for the reaction is the glycol ether whose alcoholate is used for the alkoxylation reaction.

The following examples illustrate the invention. The parts stated in the examples are parts by weight.

*Example 1*

A solution of 23 parts of sodium metal in 550 parts by volume of ethylene glycol monomethyl ether is gradually introduced with agitation into a suspension of 158.5 parts of 4-bis-(4'-carbethoxy-amino - benzenesulfonyl)-amino -3-bromo-1,2,5-thiadiazole in 450 parts by volume of ethylene glycol monomethyl ether. This forms a clear solution which is then agitated at a temperature of 45° C. for approximately one hour. It is then heated to 70° to 75° C. and kept at that temperature until a drawn sample is free from halogen when precipitated with acid. The heating usually lasts for approximately 1 hour. Most of the solvent is then removed by an aspirator and the residue is saponified for one hour at boiling heat with 1600 parts by volume of 5% caustic soda solution. The still hot solution (approximately 70° C.) is brought to a pH of 7 with concentrated HCl, treated with animal charcoal and filtered. The filtrate is brought to a pH of 3.5 at —40° C., the free sulfonamide containing water of crystallisation being precipitated. The sulfonamide is removed by suction and washed with water. The water of crystallisation is removed by azeotropic reflux distillation with 1.500 parts by volume of benzene, using a water separator. The anhydrous pure sulfonamide is crystallised from the benzene solution. The result is 69.1 parts of 4-(4'-amino-benzenesulfonamido)-3 - [β - (methoxy)-ethoxy-]-1,2,5-thiadiazole, melting point 120° to 121° C. (Kofler), corresponding to a yield of 83.7% of the theoretical value.

*Example 2*

102 parts of 4-(4' - carbethoxyaminobenzenesulfonamido)-3-bromo-1,2,5 - thiadiazole are suspended in 450 parts by volume of anhydrous ethylene glycol monoethyl ether and a solution of 17.25 parts of sodium in 550 parts by volume of ethylene glycol monoethyl ether is gradually added at a temperature of 40° to 45° C. whereafter the process continues in the manner disclosed in Example 1.

After working up, the result is 68.48 parts of 4-(4'-amino-benzenesulfonamido)-3 - [$\beta$ - (ethoxy) - ethoxy]-1,2,5-thiadiazole, melting point 150° to 151° C. corresponding to a yield of 79.4% of the theoretical value.

The following compound is obtained in an analogous manner: 4-(4'-aminobenzenesulfonamido)-3-[$\beta$-(n - propoxy)-ethoxy]-1,2,5-thiadiazole, melting point 145° to 146° C.

The alkaline saponification of the acyl amino group or of the bis-sulfonyl compound can be performed in a similar manner as described above but using a caustic potash solution instead of a caustic soda solution.

I claim:
1. A sulfanilamido-1,2,5-thiadiazole having the formula:

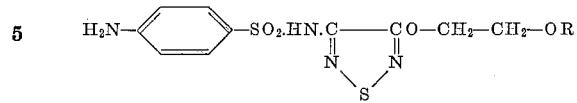

in which R is selected from the group consisting of methyl, ethyl and propyl.

2. 4-(4'-aminobenzenesulfonamido)-3-[$\beta$-ethoxy) - ethoxy]-1,2,5-thiadiazole.

3. 4-4'-aminobenzenesulfonamido)-3-[$\beta$ - (methoxy)-ethoxy]-1,2,5-thiadiazole.

4. 4-(5'-aminobenzenesulfonamido)-3-[$\beta$-(n-propoxy)-ethoxy]-1,2,5-thiadiazole.

No references cited.

WALTER A. MODANCE, *Primary Examiner.*